(12) United States Patent
Prasad et al.

(10) Patent No.: US 9,077,698 B2
(45) Date of Patent: Jul. 7, 2015

(54) GROUP SECURITY IN MACHINE-TYPE COMMUNICATION

(75) Inventors: Raghawa Prasad, Tokyo (JP); Xiaowei Zhang, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 13/703,422

(22) PCT Filed: Aug. 1, 2011

(86) PCT No.: PCT/JP2011/068001
§ 371 (c)(1),
(2), (4) Date: Dec. 11, 2012

(87) PCT Pub. No.: WO2012/018130
PCT Pub. Date: Feb. 9, 2012

(65) Prior Publication Data
US 2013/0086668 A1   Apr. 4, 2013

(30) Foreign Application Priority Data

Aug. 5, 2010   (JP) .................................. 2010-176115

(51) Int. Cl.
*H04L 9/08*   (2006.01)
*H04L 29/06*   (2006.01)
(Continued)

(52) U.S. Cl.
CPC ............. *H04L 63/065* (2013.01); *H04L 63/062* (2013.01); *H04L 9/0819* (2013.01);
(Continued)

(58) Field of Classification Search
CPC ..... H04L 9/0819; H04L 9/083; H04L 9/0833; H04L 29/12207; H04L 63/062; H04L 63/06; H04L 63/065; H04L 63/067; H04L 61/20; H04W 4/06; H04W 4/08; H04W 4/005

USPC ............................................. 726/7, 2, 3, 4, 5
See application file for complete search history.

(56) References Cited

U.S. PATENT DOCUMENTS 6,584,566 B1   6/2003   Hardjono
6,813,714 B1   11/2004   Hardjono et al.
(Continued)

FOREIGN PATENT DOCUMENTS

JP   2004-166190   6/2004
JP   2006-081184   3/2006
(Continued)

OTHER PUBLICATIONS

"Machine-to-Machine communication (M2M); Functional architecture", Draft ETSI TS 1 02 690 V<O.1.3> (Feb. 2010).*
(Continued)

*Primary Examiner* — Kambiz Zand
*Assistant Examiner* — Ayoub Alata
(74) *Attorney, Agent, or Firm* — Young & Thompson

(57) ABSTRACT

If the related secure communication method is applied to the system which includes a plurality of the MTC devices, traffic in a network would increase in proportion to the number of MTC devices. A disclosed communication apparatus is connected to a network and a plurality of communication terminals, and includes: a group information sending unit for sending group information, which is received from the network; an access control unit for 1) receiving a reply from the communication terminal(s) which responded to the group information and 2) sending the reply to the network; and a temporary identifier and group key sending unit for sending a temporary identifier and a group key to the communication terminal which responded to the group information, when the communication apparatus received the temporary identifier and the group key from the network.

13 Claims, 10 Drawing Sheets

(51) Int. Cl.
*H04L 29/12* (2006.01)
*H04W 4/00* (2009.01)
*H04W 4/08* (2009.01)

(52) U.S. Cl.
CPC .............. *H04L 63/067* (2013.01); *H04L 9/083* (2013.01); *H04L 9/0833* (2013.01); *H04L 29/12207* (2013.01); *H04L 61/20* (2013.01); *H04W 4/005* (2013.01); *H04W 4/08* (2013.01)

(56) References Cited

U.S. PATENT DOCUMENTS

| | | | |
|---|---|---|---|
| 7,702,344 | B2 | 4/2010 | Moon et al. |
| 7,945,272 | B2 | 5/2011 | Kim |
| 2003/0044020 | A1 | 3/2003 | Aboba et al. |
| 2003/0177267 | A1 | 9/2003 | Orava et al. |
| 2006/0063548 | A1 | 3/2006 | Kim |
| 2007/0071021 | A1 | 3/2007 | Girao |
| 2009/0024848 | A1 | 1/2009 | Takasugi et al. |
| 2010/0011063 | A1 | 1/2010 | Blaiotta et al. |
| 2011/0072121 | A1 | 3/2011 | Takasugi et al. |
| 2011/0213871 | A1* | 9/2011 | DiGirolamo et al. ......... 709/223 |

FOREIGN PATENT DOCUMENTS

| | | |
|---|---|---|
| JP | 2007-36541 | 2/2007 |
| JP | 2007-089156 | 4/2007 |
| JP | 2008-257340 | 10/2008 |
| JP | 2008-543137 | 11/2008 |
| JP | 2009-124464 | 6/2009 |
| WO | 2007072814 | 6/2007 |
| WO | WO 2009/042518 | 4/2009 |

OTHER PUBLICATIONS

3GPP TS 22.368 "Service requirements for Machine-Type Communications (MTC); Stage 1" (Release 10) (Mar. 2010).
3GPP TR 23.888 "System Improvements for Machine-Type Communications" (Release 10) (Jul. 2010).
3GPP TS 33.401 "3GPP System Architecture Evolution (SAE); Security architecture" (Release 9) (Oct. 2010).
International Search Report PCT/JP2011/068001 dated Nov. 3, 2011, with English translation.
3GPP TS 22.368, "Services requirements for Machine-Type Communications (MTC); Stage 1", V10.1.0, (Release 10), (Jun. 2010), URL, http://www.3gpp.org/ftp/Specs/archive/22_series/22.368/22368-a10.zip.
Japanese Office Action dated Feb. 12, 2014 in corresponding Japanese Patent Application No. 2013-505235 with partial English translation of Japanese Office Action.

* cited by examiner

GROUP SECURITY IN MACHINE-TYPE COMMUNICATION

TECHNICAL FIELD

This invention provides a security solution for group based Machine-Type Communication (MTC) which is disclosed in non patent literature 1 and 2. The invention intends to reduce the signaling between MTC devices and network and establish efficient secure communication between group based MTC devices and the network.

BACKGROUND ART

MTC communication has been drawing attention in both the technical/academic and industry. According to the current 3GPP (3rd Generation Partnership Project) specifications, the MTC devices in the same area and/or have the same MTC feature attributed and/or belong to the same MTC user can group together and communicate to network as a unit.

However, from security point of view it is not yet described that how the MTC devices that belong to a group establish secure communication with network, including the authentication to devices and key allocation. Neither that how a MTC device establishes secure communication with network when it newly joins a group.

A method to establish such a secure communication between communication devices is disclosed in patent literature 1. In patent literature 1, when a distributing server, which distributes data, receives a distributing request from another server (requesting server), the distributing server sends a security request to the requesting server. The requesting server performs setting for its security and sends information on the security setting. The distributing server confirms the security setting of the requesting server, and then sends requested data to the requesting server if there is no problem on the security setting received.

Furthermore, related arts are disclosed in patent literature 2, 3 and 4 as follows.

In patent literature 2. a method by using hush function to generate a temporary identifier (ID) for a new wireless communication device which does not conflict with IDs of the other wireless communication devices, is disclosed.

A communication method between communication devices is disclosed in patent literature 3. One-to-one or one-to-multiple communication is performed between devices which are set as the same group.

In patent literature 4, it is disclosed that an integrating entity integrates messages received from a plurality of entity, and send the integrated message to its destination.

Patent literature 5 discloses a M2M (Machine to Machine, Mobile to Machine. Machine to Mobile) module which is connected to a network.

CITATION LIST

Patent Literature

[Patent Literature 1] Japanese Patent Application Laid-Open No. 2008-257340
[Patent Literature 2] International Patent Publication No. WO2007/072814
[Patent Literature 3] Japanese Patent Application Laid-Open No. 2006-081184
[Patent Literature 4] Japanese Patent Application Laid-Open No. 2007-089156
[Patent Literature 5] Japanese Patent Application Laid-Open No. 2008-543137

Non Patent Literature

[Non Patent Literature 1] TS 22.368 "Service requirements for Machine-Type Communications (MTC); Stage 1" (Release 10).
[Non Patent Literature 2] TS 23.888 "System Improvements for Machine-Type Communications" (Release 10).
[Non Patent Literature 3] TS33.401 "3GPP System Architecture Evolution (SAE); Security architecture" (Release 9).

SUMMARY OF INVENTION

Technical Problem

However, patent literature 1 discloses secure communication between single communication devices, in other words, one-to-one communication. Therefore, if the secure communication method disclosed in patent literature 1 is applied to the system supposed in non patent literature 1, which includes a plurality of the MTC devices, traffic in a network would increase in proportion to the number of MTC devices. This is because that the communication is carried between each single MTC device and the network.

Solution to Problem

There are two main practical situations considered. One is the group has been created and the group ID (grID) is shared by the MTC devices that belong to the group and the network before any communication started. For the devices the grID is embedded in its USIM (Universal Subscriber Identity Module) card. This will be presented in Invention I.

The other situation is for a MTC device to join an existing group. The network does not have knowledge about this MTC device in advance. However the MTC devices who satisfy the network's requirement for a group can request to join the group. In the opposite of invention I, the network and the MTC device can not reach an agreement in advanced. The solution will be proposed in Invention II. It is optional for gateway to have an UICC (Universal Integrated Circuit Card). When a MTC device functions as a gateway, it will have an UICC.

An exemplary object of the invention is to provide a communication apparatus, a communication system, a communication method and a storage medium for storing a communication program which can solve the problem described above.

A communication apparatus to an exemplary aspect of the invention, which is connected to a network and a plurality of communication terminals, includes: a group information sending means for sending group information which is received from the network; an access control means for receiving a reply from the communication terminal which responded to the group information and for sending the reply to the network; and a temporary identifier and group key sending means for sending a temporary identifier and a group key to the communication terminal which responded to the group information, when the communication apparatus received the temporary identifier and the group key from the network.

A communication system to an exemplary aspect of the invention includes: a plurality of communication terminals; a network; and a communication apparatus which relays communication between the plurality of communication terminals and the network: wherein the communication apparatus receives group information from the network, sends the group information to the plurality of communication terminals, and sends a temporary identifier and a group key to the communication terminal replied to the group information.

A communication method to an exemplary aspect of the invention, which is performed between a network and a plurality of communication terminals, the method includes: receiving group information from the network; sending the group information to the plurality of communication terminals; receiving a reply to the group information from the communication terminal: and sending a temporary identifier and a group key to the communication terminal replied to the group information.

A storage medium for storing a communication program to an aspect of the invention includes: a group information sending process for sending group information which is received from the network: an access control process for receiving a reply from the communication terminal which responded to the group information and for sending the reply to the network; and a temporary identifier and group key sending process for sending a temporary identifier and a group key to the communication terminal which responded to the group information, when the temporary identifier and the group key are received from the network.

Advantageous Effects of Invention

According to the present invention, traffic between MTC devices and the network can be decreased and a secure communication will be established between the group based MTC devices and the network.

DESCRIPTION OF EMBODIMENTS

Invention I

The object of the invention is achieved by using a gateway (GW) for security management to group optimized MTC devices. Main role of the gateway is to establish security communication between the MTC devices and the core network distribute group key (grKey) and unicast temporary IDs to the MTC devices, and optionally perform access control and generate temporary IDs.

A few assumptions are made for this invention as below.
1. The gateway and the core network (CN) have established secure communication.
2. The group is created beforehand on network decision.
3. The unique group ID is known by all of the MTC devices within the group and retrieved by the gateway from the network before any communication is started.
4. The authentication between the gateway with UICC and the network and between the MTC devices and the network follows 3GPP standard AKA (Authentication and Key Agreement).
5. Each gateway can manage more than one group.

The invention consists of the steps below.
1. The gateway broadcasts the grIDs and sets a timer. A MTC device will respond to the gateway with a matched grID it holds.
2. The gateway sends a concatenated Attach Request message to the network for the MTC devices responded before the timer is expired.
3. Access control against MTC list for the MTC devices responded the broadcast is performed by (1) the gateway only, (2) the network only, (3) or both the gateway and the network.
4. AKA procedure for the MTC devices is performed in the way that all the messages from the MTC devices are collected by the gateway and sent to the network in a concatenated message. In the same way, the message sent from the network is a concatenated message and the gateway will distribute to each MTC device.
5. After a successful AKA procedure, a Security Mode Command (SMC) procedure is performed as that of 3GPP standard [3]. From which, the integrity and confidential keys are generated and activated for communication between the MTC devices and the network.
6. The gateway receives grKey from the network after the secure communication is established between them, and before the gateway distributes it to the MTC devices. The gateway can optionally generate the grKey itself.
7. The network creates a unique temporary ID (tempID) for each MTC devices, by which it can exclusively recognize and communicate with a MTC device. It sends the tempIDs to the gateway, and the gateway unicasts the tempID to each MTC device. The gateway can optionally create tempID for a MTC device. In this case, it will send the tempIDs to the network.

Figure 1:
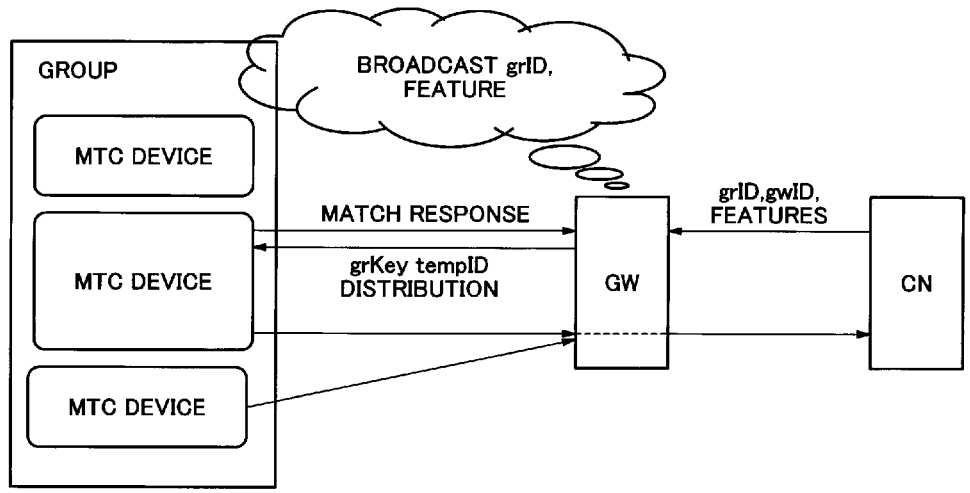
FIG. 1 is a block diagram for the Invention I.
Figure 2:
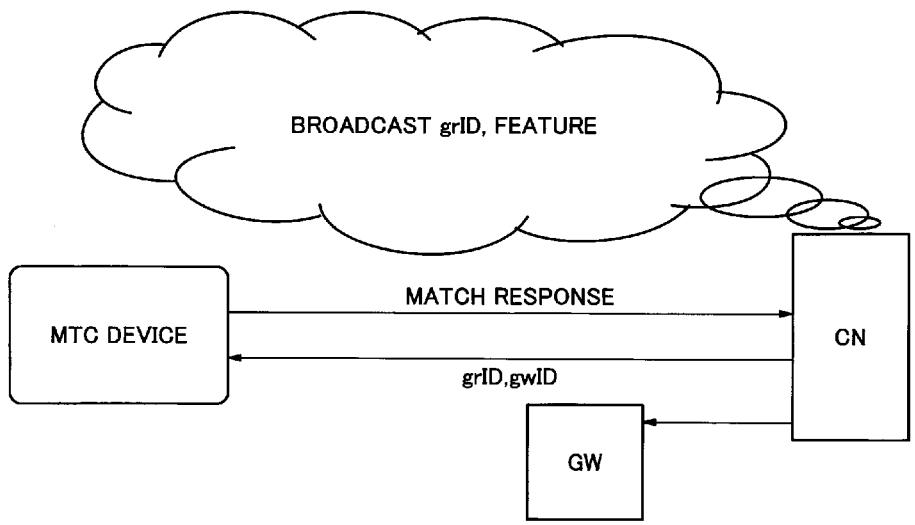
FIG. 2 is a block diagram for the Invention II.
Figure 3:
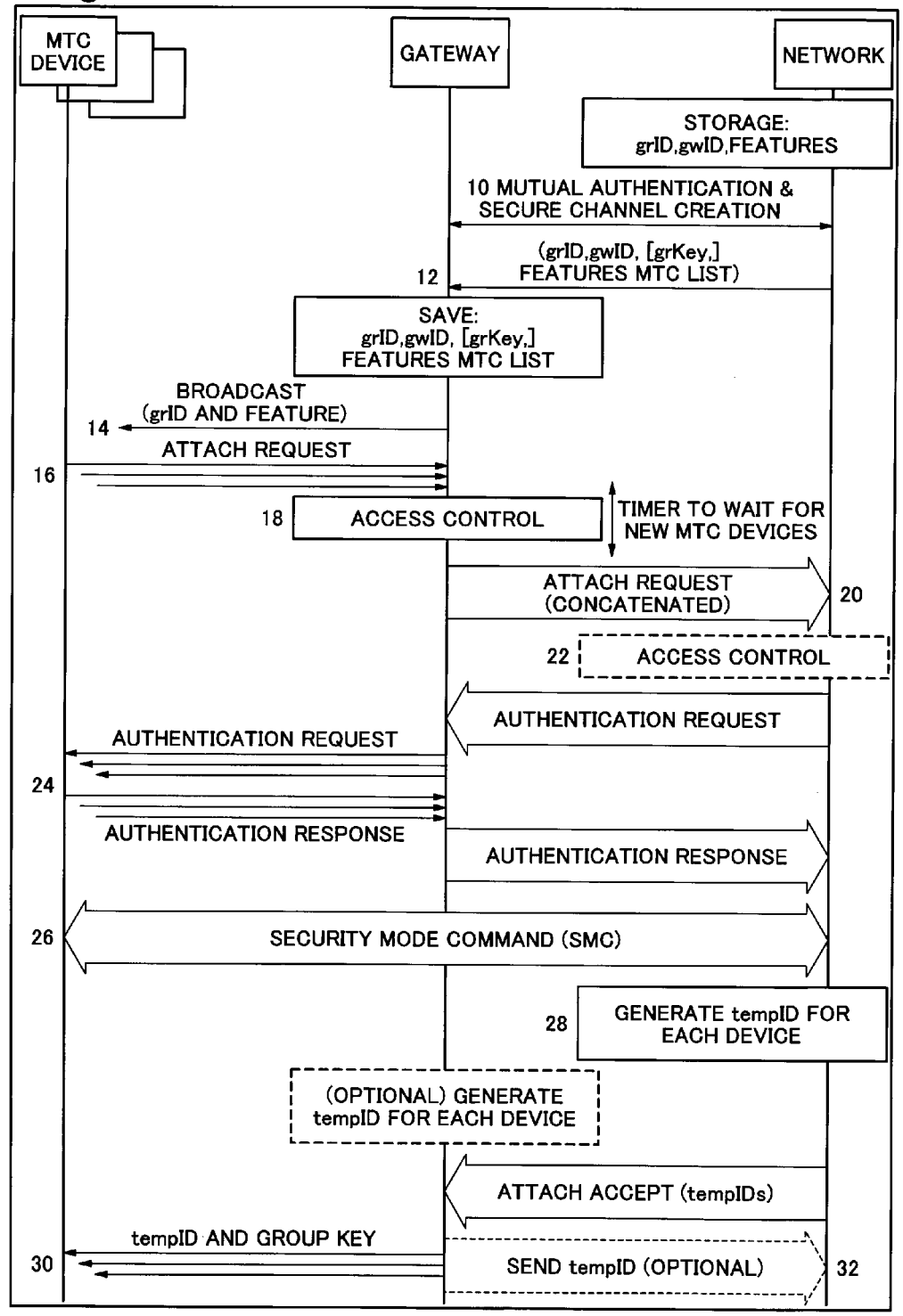
FIG. 3 is a message sequence chart between MTC device, gateway and core network in the Invention I.

FIG. 3 is a message sequence chart between the MTC device, the gateway and the core network in the Invention I.

At step 10, the gateway and the core network perform mutual authentication and establish secure channel.

At step 12, the network sends the grID, the gwID, the grKey, the group feature and the MTC list to the gateway. The grKey can be optionally generated by the gateway.

At step 14, the gateway broadcasts the grID with features of a group, and starts a timer to wait the MTC device's response.

At step 16, the MTC device which has stored the grID and the feature matched with those in the broadcast shall respond the broadcast.

At step 18, the gateway will perform access control for the MTC device which responded its broadcast, by comparing the received grID against the MTC list. When the timer is expired, any response from the MTC devices will be discarded. The access control here is optional if the network will perform access control.

At step 20, the gateway sends a concatenated Attach Request message including all the Attach Request messages from the MTC devices.

At step 22, the network will perform access control against the MTC list. This procedure is optional if the gateway performs access control and the network trusts it.

At step 24, the network performs authentication procedure with the MTC devices, followed by a Security Mode Command (SMC) procedure in step 26.

At step 28, the network (or the gateway optionally) generates a unique temporary ID for each MTC device. If the network generated the tempIDs, it will send them to the gateway in the Attach Accept message. If the gateway generated tempIDs, it will inform them to the network in step 32.

At step 30, the gateway unicasts the tempIDs and distributes the grKey to the MTC devices.

Invention II

The object of the invention is achieved by a strategy that the network broadcasts feature requirements of a group, since the network does not have any previous knowledge about the MTC devices which are to be in the group. The MTC devices which meet those feature requirements will (request to join a group) be authenticated individually by the network.

Assumption 1, 4, 5 of Invention I applies here. And a few other assumptions are made for this invention as below.

1. The network and the MTC devices do not have any knowledge about each other beforehand.

2. Mutual authentication between the network and the MTC devices, and identity allocation follow 3GPP standard procedure.

The invention consists of the steps below.

1. The network broadcasts features of a group.

2. The MTC devices which match the feature may respond, e.g. by sending an Attach request to join the group.

3. The network performs authentication and access control for the MTC devices.

4. The network generates and sends the tempID to the MTC devices.

5. The network informs the gateway which MTC device will join the group by sending the MTC device identity to the gateway.

6. The generation of tempID can optionally be done by the gateway, if so, the network will send the IMSIs (International Mobile Subscriber Identity) of the MTC devices to the gateway. The gateway will send the network the tempIDs after the generation.

7. The gateway distributes the grKey to the MTC devices.

Figure 4:
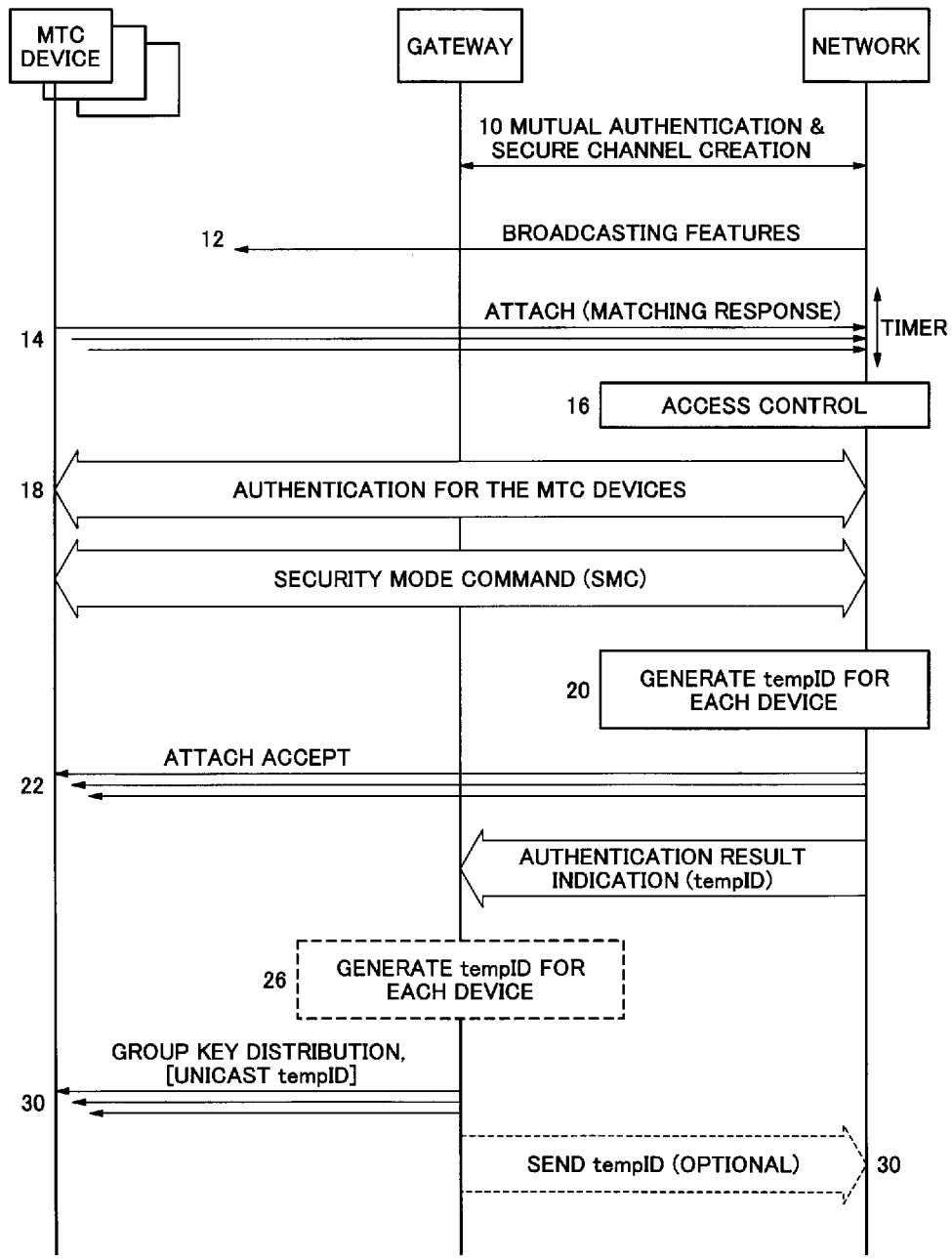
FIG. 4 is a message sequence chart between MTC device, gateway and core network in the Invention II.

FIG. 4 is a message sequence chart between the MTC device, the gateway and the core network in the Invention II.

At step 10, the gateway and the core network perform mutual authentication and establish secure channel.

At step 12, the network broadcasts the group features and starts a timer to wait the MTC device to respond.

At step 14, the MTC device which matches the features can respond by sending a request of joining the group.

At step 16, the network will perform access control against the MTC list. When the timer is expired, any response from the MTC devices will be discarded.

At step 18, the network will perform authentication with the MTC device which responded its broadcast, followed with a SMC procedure.

At step 20, the network will generate a tempID which is unique for each MTC device.

At step 22, the network will send the tempID to the MTC device in the Attach Accept message.

At step 24, the network will indicate the gateway the succeeded authenticated MTC devices' tempID.

At step 28, the gateway distributes the grKey to the MTC devices, and can optionally unicast the tempIDs to the MTC devices which can be generated in step 26. If the gateway generates the tempIDs, it will send them to the network.

According to the embodiments described above, sending concatenated messages between the gateway to the network decreases signaling and provides efficiency especially when the group size grows large. Using a gateway for the security management of a group, it prevents further attacks to a network. It provides flexibility for a group to have new members. Access control tempID generation locally performed by the gateway can also reduce the network's load.

Hereinafter, the exemplary embodiments of the present invention are described in detail with reference to accompanying drawings.

First Exemplary Embodiment

Configuration of the First Exemplary Embodiment

Figure 5:
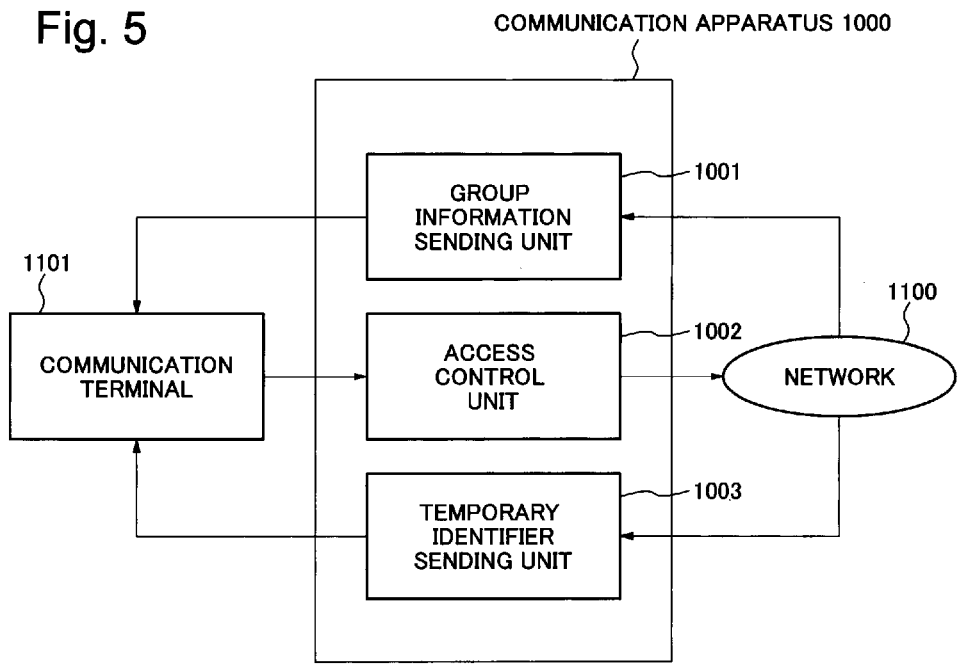
FIG. 5 is a block diagram showing a configuration of the communication apparatus in the first exemplary embodiment.

FIG. 5 shows a configuration of a communication apparatus 1000. According to FIG. 5, the communication apparatus is connected to a communication terminal 1101 and a network 1100. Although a single communication terminal 1101 is shown in FIG. 5, there may be more than one communication terminals.

According to FIG. 5, the communication apparatus 1000 includes a group information sending unit 1001, an access control unit 1002 and a temporary identifier and group key sending unit 1003. Each of them is connected to the communication terminal 1101 and the network 1100.

Operation of the First Exemplary Embodiment

Figure 6:
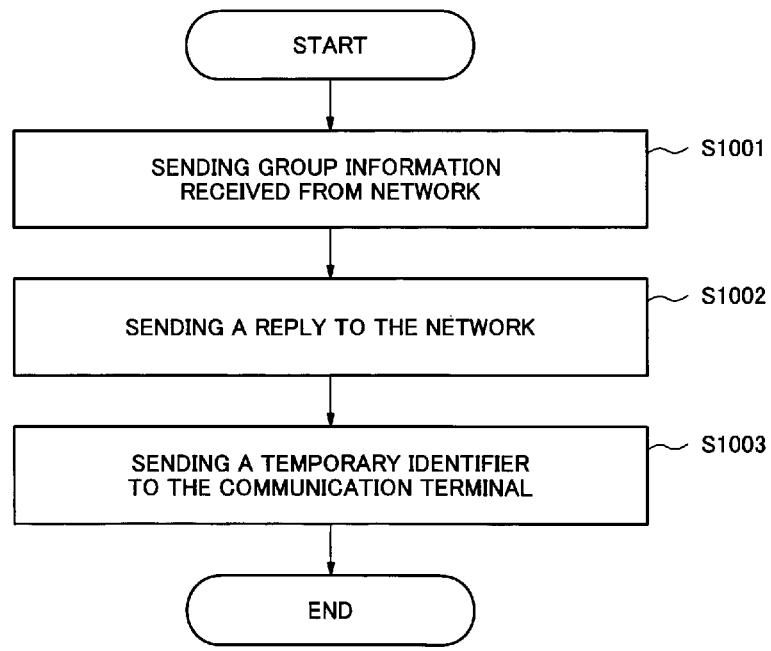
FIG. 6 is a flowchart showing an operation in the first exemplary embodiment.

FIG. 6 shows an operation by the communication apparatus 1000.

First of all, the group information sending unit 1001 sends group information, which is received from the network 1100, to the communication terminal 1101 (S1001).

Next, the access control unit 1002 sends a reply to the network 1100 (S1002). The reply is a reply which access control unit 1002 receives from the communication terminal 1101, in response to the group information sent in step S1001.

Finally, the temporary identifier and group key sending unit 1003 sends a temporary identifier and a group key to the communication terminal 1101, which responded to the group information, when the temporary identifier and group key sending unit 1003 received the temporary identifier from the network 1100 (S1003).

Effect Caused by the First Exemplary Embodiment

According to the first exemplary embodiment described above, the communication apparatus 1000 sends a reply to the network 1100 notifying the response from the communication terminal 1101, and also the communication apparatus 1000 sends the temporary identifier and the group key to the communication terminals 1101 which responded to the group information.

Therefore, according to the first exemplary embodiment, traffic can be decreased and a secure communication can be established with the network.

Second Exemplary Embodiment

Configuration of the Second Exemplary Embodiment

Figure 7:
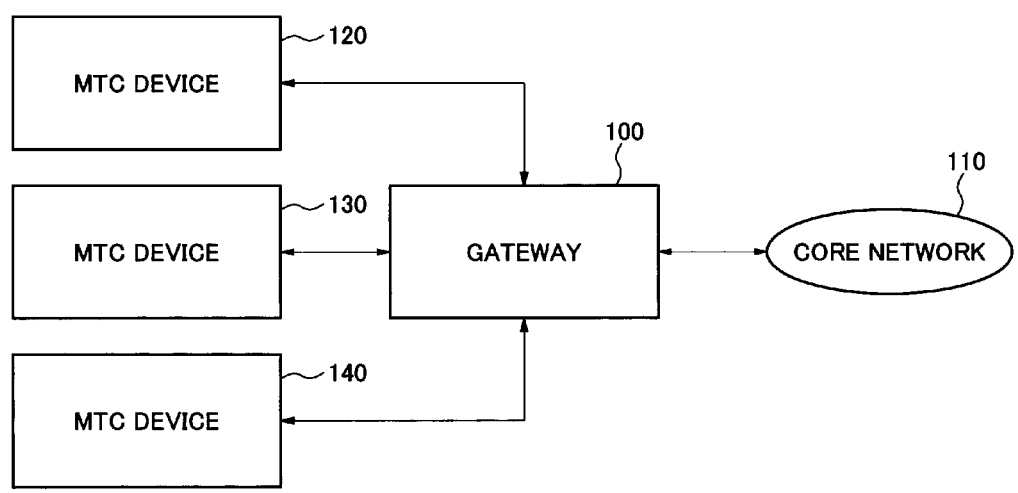
FIG. 7 is a block diagram showing a configuration of the communication system in the second exemplary embodiment.

FIG. 7 shows a configuration of a system of the second exemplary embodiment in the present invention. According to FIG. 7, the system includes a gateway 100, a core network 110, a MTC device 120, a MTC device 130 and a MTC device 140.

The core network 110 is connected to the MTC devices 120 to 140, via the gateway 100. Since the MTC devices 120 to 140 have the same configuration, the MTC device 120 will only be described in detail, and description on the other two will be omitted hereinafter, for simplicity of the description.

Figure 8:
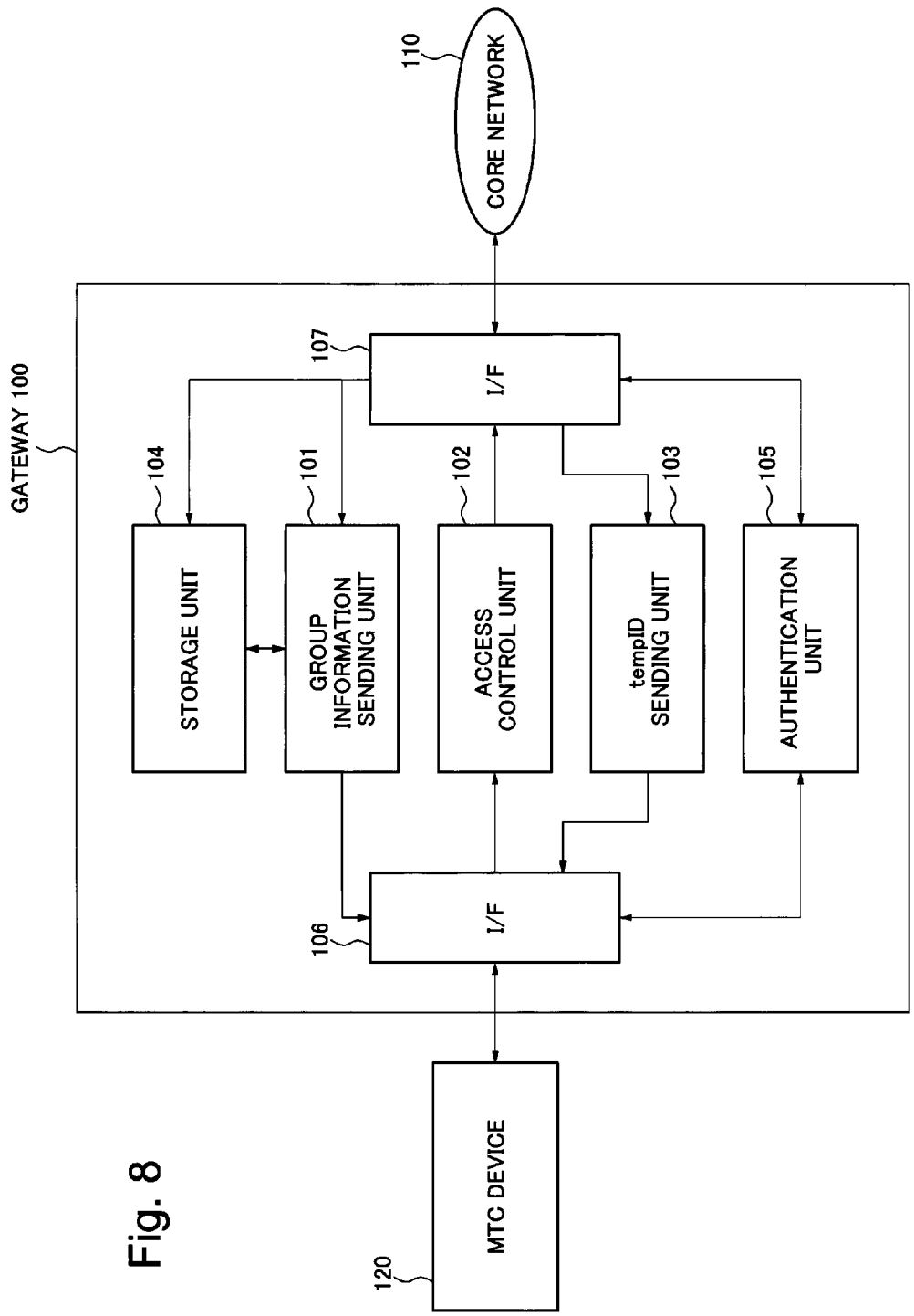
FIG. 8 is a block diagram showing a configuration of the gateway in the second exemplary embodiment.

FIG. 8 shows a configuration of the gateway 100. According to FIG. 8, the gateway 100 includes a group information sending unit 101, an access control unit 102, a tempID sending unit 103 and a storage unit 104. Furthermore, the gateway 100 includes an authentication unit 105, an interface (I/F) 106 and an interface (I/F) 107.

The group information sending unit 101 receives group information, a gwID (gateway ID), a grKey (group key) and a MTC list from the core network 110 via the I/F 107, and stores the received group information in the storage unit 104. Also, the group information sending unit 101 sends/broadcasts the received group information to the MTC devices via the I/F 106.

The group information includes information such as a grID and a group feature. The grID is an identifier indicating which group the MTC device belongs to. The group feature may be a MTC feature described in background art. As described in background art, the MTC devices which have the same grID or the same group feature may be in the same group.

The grKey is a pair of integrity and confidential keys, held by each group. The MTC devices in the same group have the same grKey. The grKey is used for communication between the MTC devices and the gateway 100. The grKey may be renewed when there is a member (MTC device) leaves the group (which can be also periodically).

The MTC list is a list of the MTC devices held by the core network 110. The access control for the MTC devices can be performed according to the MTC list. If the core network 110 can send the MTC list to the gateway 100, the gateway 100 may also perform the access control.

The access control unit 102 receives a response from the MTC devices which responded to the group information sent by the group information sending unit 101. The access control unit 102 performs access control for the MTC devices which responded, by comparing the received response against the MTC list. Although it is described that the plurality of the MTC devices responded to the group information, it applies to the case when there is only a single MTC device. The access control unit 102 also sends the response received from the MTC devices, to the core network 110 via the I/F 107. In the case that a plurality of the MTC device responded to the group information, then the access control unit concatenates the replies and then sends the concatenated message to the core network 110.

The tempID sending unit 103 receives the tempID generated in the core network 110, via the I/F 107. The tempID sending unit 103 also sends/broadcasts the received tempID to the MTC devices which responded to the group information sent by the group information sending unit 101.

The storage unit 104 stores the group information sent from the core network 110.

The authentication unit 105 performs authentication between the MTC devices and the core network 110.

The I/F 106 and 107 relays all the communications between the MTC devices and the gateway 100, and the communications between the gateway 100 and the core network 110, respectively.

Figure 9:
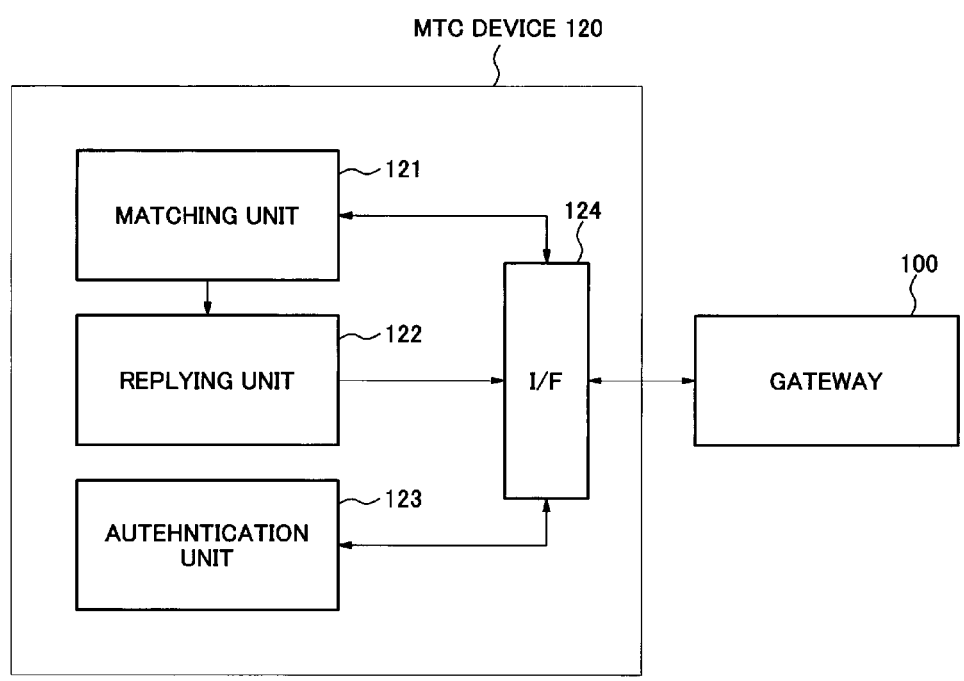
FIG. 9 is a block diagram showing a configuration of the MTC device in the second exemplary embodiment.

FIG. 9 shows a configuration of the MTC device 120. As described above, the MTC devices 130 and 140 have the same configuration as the MTC device 120, therefore descriptions on the MTC devices 130 and 140 will be omitted.

According to FIG. 9, the MTC device 120 includes a matching unit 121, a replying unit 122, an authentication unit 123 and an I/F 124.

The matching unit 121 receives the group information sent from the gateway 100. Also, the matching unit 121 determines whether the received group information matches the group information of the MTC device 120. Specifically, if the matching unit 121 receives the grID "A", the matching unit 121 determines whether the MTC device 120 itself has the grID "A".

If the received group information matches the group information of the MTC device 120, then the replying unit 122 sends a reply to the gateway 100. If the received group information does not match the group information of the MTC device 120, then no reply is sent from the replying unit 122.

The authentication unit 123 performs authentication between the MTC device 120 and the gateway 100/the core network 110.

The I/F 124 relays all the communications between the MTC device 120 and the gateway 100.

Figure 10:
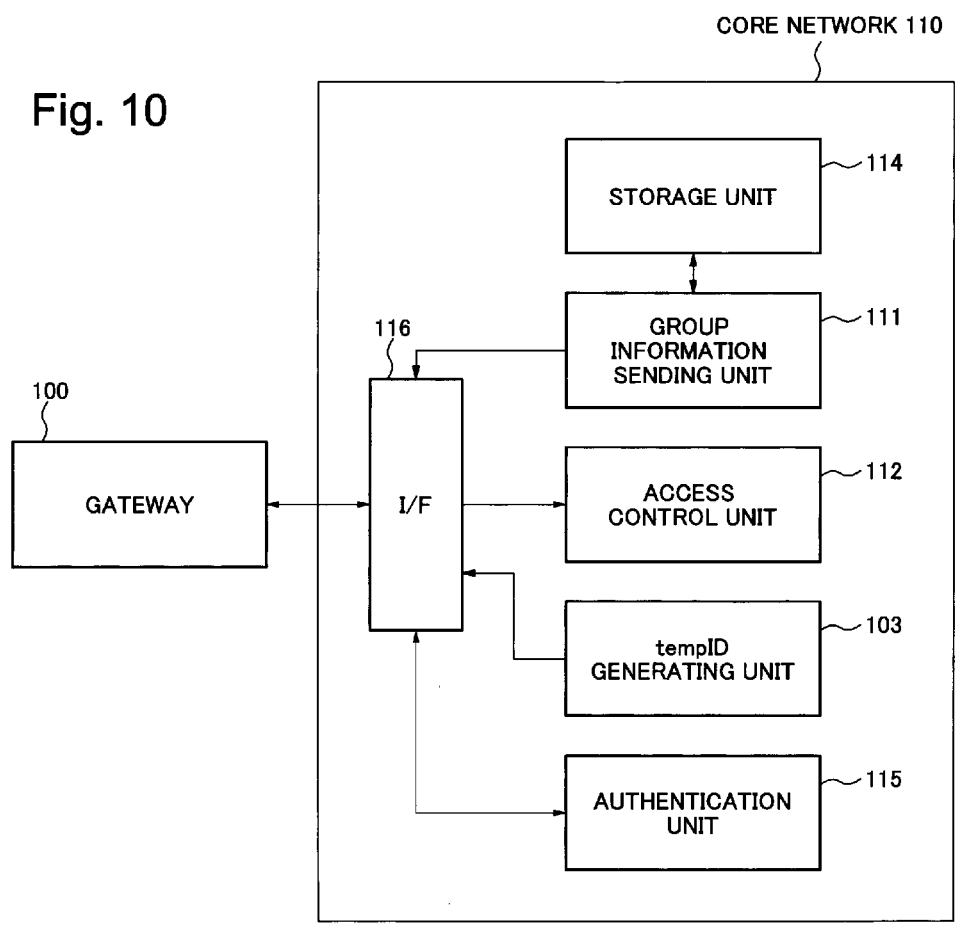
FIG. 10 is a block diagram showing a configuration of the core network in the second exemplary embodiment.

FIG. 10 shows a configuration of the core network 110. According to the FIG. 10, the core network 110 includes a group information sending unit 111, an access control unit 112, a tempID generating unit 113, a storage unit 114, an authentication unit 115 and an I/F 116.

The group information sending unit 111 sends the group information, the gwID, the grKey, the group feature and the MTC list to the gateway 100.

The storage unit 114 stores the group information, the gwID, the group feature and the MTC list to be sent.

The access control unit 112 performs access control for the MTC devices which responded, against the MTC list stored in the storage unit 114. The access control performed by the access control unit 112 may be omitted if the gateway 100 performs the access control and the access control performed by the gateway 100 is trusted by the core network 110.

The tempID generating unit 113 generates a unique tempID for each of the MTC devices which responded to the group information. Optionally, the gateway 100 may also generate the tempID. If the core network 110 generated the tempID, it will send the tempID to the gateway 100 in the Attach Accept message. If the gateway 100 generated the tempID, then the gateway 100 informs the core network 110 that the tempID was generated, while the gateway 100 sending the tempID to the MTC devices.

Also, the tempID generating unit 113 may generate a grKey for each group.

The authentication unit 115 performs authentication between the core network 110 and the MTC devices, via the gateway 100.

The I/F 116 relays all the communications between the gateway 100 and each of the units in the core network 110.

Operation of the Second Exemplary Embodiment

Figure 11:
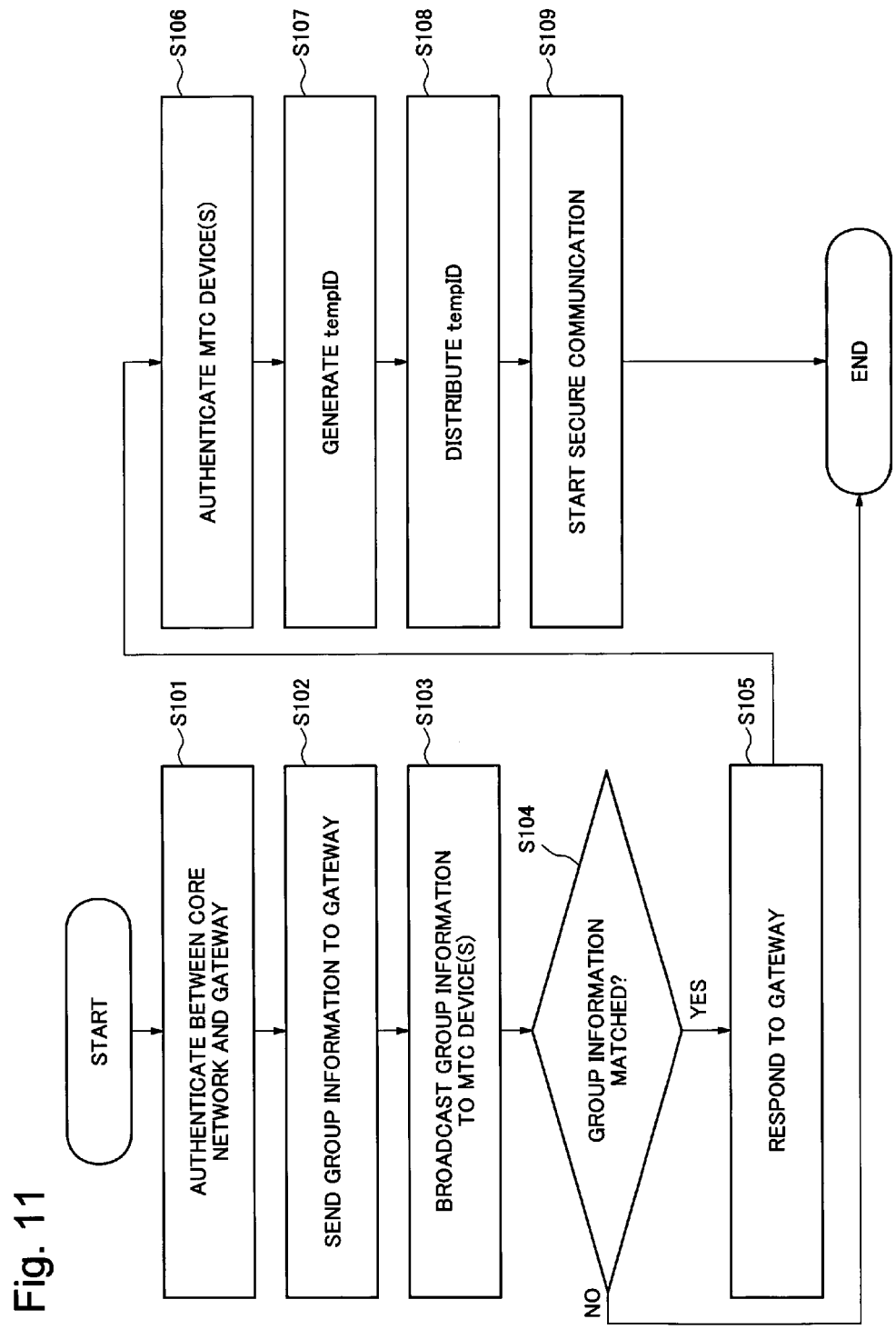
FIG. 11 is a flowchart showing an operation in the second exemplary embodiment.

FIG. 11 shows an operation of the second exemplary embodiment. For example, suppose the case that both of the MTC devices 120 and 130 have the grID "A".

Firstly, the authentication unit 105 in the gateway 100 and the authentication unit 115 in the core network 110 perform mutual authentication with each other (S101). After the authentication is done, a secure channel for a secure communication is established between the gateway 100 and the core network 110.

Next, the group information sending unit 111 sends the group information, the gwID, the grKey and the MTC list to the gateway 100 (S102). For example, suppose that the group information sending unit 111 sends the grID "A" as the group information.

The group information sending unit 101 in the gateway 100 then receives the group information, the gwID, the grKey and the MTC list from the core network 110. The group information sending unit 101 stores the received information to the storage unit 104. Next, the group information sending unit 101 sends or broadcasts the received group information to the MTC devices (S103).

The matching unit 121 in the MTC device 120 receives the group information sent in the step S103. The matching unit 121 then determines whether the received group information matches the group information of the MTC device 120 (S104).

If the received group information matches the group information of the MTC device 120, then the replying unit 122 sends a reply to the gateway 100 (S105).

If the received group information does not match the group information of the MTC device 120, then no reply is sent from the replying unit 122 and the operation is end (S104: "NO").

After the step S105, the access control unit 102 receives the reply from the MTC devices. In this case, the MTC device 120 and 130 reply to the gateway 100, since the received grID "A" matches both of their grIDs "A". Then the access control unit 102 sends the reply, or a concatenated message, which is made by concatenating the replies from the MTC devices.

The access control is performed by using the MTC list, which is performed by the access control unit 102 in the gateway 100 (S106). The access control may be performed by the access control unit 112 in the core network 110, as described above.

The access control unit 102 in the gateway 100 may wait to send the reply to the core network 110 for a predetermined period, since the other MTC devices may respond to the group information as well.

After the access control unit 112 received the reply or the concatenated message, then the authentication unit 115 starts performing authentication of the MTC devices responded (S106). The authentication in the step S106 is performed between the authentication unit 115 in the core network 110, the authentication unit 105 in the gateway 100 and the authentication unit 123 in the MTC device 120.

Next, the tempID generating unit 113 generates unique tempIDs for each of the MTC devices responded to the gateway 100 in the step S105 (S107). In the example, tempID generating unit 113 generates two unique tempIDs for each of the MTC device 120 and 130.

Then, the tempID generating unit 113 in the core network 110 sends the tempIDs, which are generated in the step S107, and the grKeys for each group of the MTC devices to the gateway 100. The tempIDs and the grKeys are sent as a concatenated message. The tempID sending unit 103 receives the concatenated message sent from the core network 110. The tempID sending unit 103 then sends or broadcasts the received tempIDs and the grKeys to the MTC devices (S108).

After the step S108, the authentication unit 123 in the MTC device 120 receives the tempID and the grKey sent from the gateway 100.

Effect Caused by the Second Exemplary Embodiment

According to the second exemplary embodiment described above, the gateway 100 sends a concatenated message to the core network 110 notifying the responses by the MTC devices, and also the gateway 100 sends the tempIDs and the grKeys in a concatenated message to the MTC devices which responded to the group information.

Therefore, according to the second exemplary embodiment, traffic between MTC devices and the network can be decreased and the secure communication can be established between them in the system of the second exemplary embodiment.

Furthermore, according to the second exemplary embodiment, the gateway 100 sends a concatenated message, which is made by concatenating replies from the MTC devices responded to the group information, to the core network 110.

By sending a concatenated message rather than forwarding replies from the MTC devices, it is possible to reduce the traffic in the system of the second exemplary embodiment. The decrease in the traffic would be more efficient especially when a size of the group of the MTC devices increases.

Third Exemplary Embodiment

A configuration of the third exemplary embodiment is the same as that of the second exemplary embodiment. Therefore, description of the configuration of the third exemplary embodiment will be omitted. The difference between the third exemplary embodiment and the second exemplary embodiment will be described as follows.

In the third exemplary embodiment, it is supposed that the core network 110 does not have any previous knowledge about the MTC devices which will require joining a group. The core network 110 sends the feature of a group to the MTC devices, and the MTC devices which meet the received feature reply and will be authenticated individually by the core network 110.

Figure 12:
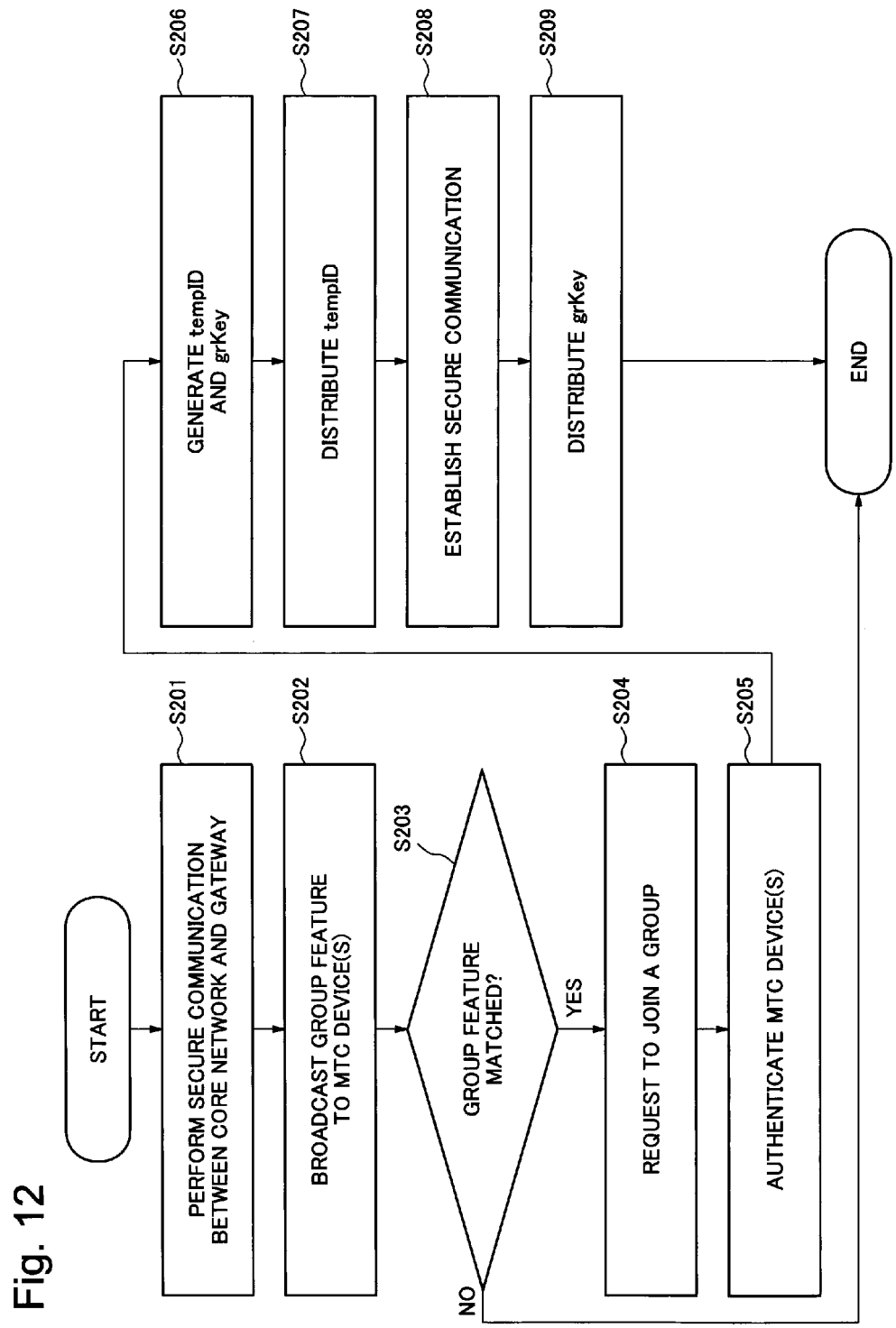
FIG. 12 is a flowchart showing an operation in the third exemplary embodiment.

FIG. 12 shows an operation of the third exemplary embodiment. For example, suppose the case that both of the MTC devices 120 and 130 have a feature "B".

Firstly, the authentication unit 105 in the gateway 100 and the authentication unit 115 in the core network 110 performs authentication to each other to establish a secure communication between them (S201).

Next, the group information sending unit 111 in the core network 110 sends or broadcasts the group feature to the MTC devices (S202). In the step S202, the gateway 100 may receive the group feature from the core network 110. In this case, the group information sending unit 101 sends or broadcasts the received group information to the MTC devices.

The matching unit 121 in the MTC device 120 receives the group feature sent in the step S202. The matching unit 121 then determines whether the received group information matches the group feature of the MTC device 120 (S203).

If the received group feature matches the group information of the MTC device 120, then the replying unit 122 sends a request to join a group, to the core network 110 (S204).

In the step S204, the request from the MTC devices may be sent directly to the core network 110 or the request may be passed through the gateway 100. In the latter case, the access control unit 102 receives the request from the MTC devices. The access control unit 102 then sends a concatenated message, which is made by concatenating the received requests from the MTC devices. Since the both cases are not different except the gateway 100 relays the request in the latter case, the latter case will be described hereinafter.

If the received group feature does not match the group feature of the MTC device 120, then no request is sent from the replying unit 122 and the operation ends (S203: "NO").

After the step S204, the access control unit 102 in the gateway 100 receives the request. In this case, the MTC device 120 and 130 send requests to join a group to the gateway 100, since the received group feature "B" matches both of their features "B". Then the access control unit 102 sends the request, or a concatenated message, which is made by concatenating the requests from the MTC devices.

The access control is performed by using the MTC list, which is performed by the access control unit 112 in the core network 110 (S205).

The access control in the step S205 may also be performed by the access control unit 102 in the gateway 100. The access control unit 112 may also perform SMC between the core network 110 and the MTC devices.

The access control unit 112 in the core network 110 may wait to start performing authentication with the MTC devices for a predetermined period, since the other MTC devices may request as well.

When the access control unit 112 received the concatenated message or when the predetermined period expired, the authentication unit 115 starts to perform authentication of the MTC devices which sent the request.

Next, the tempID generating unit 113 generates unique tempIDs for each of the MTC devices requested to join a group in the step S204 (S206). The tempID generating unit 113 may also generate the grKey for each of the groups, if the grKeys are not generated yet.

Then, the tempID generating unit 113 sends the tempIDs, which are generated in the step S206, and the grKeys for each group of the MTC devices to the gateway 100. The tempIDs and the grKeys are sent as a concatenated message. The tempID sending unit 103 receives the concatenated message sent from the core network 110. The tempID sending unit 103 then sends or broadcasts the received tempIDs and the grKeys to the MTC devices (S207). The tempID generating unit 113 may directly broadcast the tempIDs and the grKeys to the MTC devices as well.

Effect Caused by the Second Exemplary Embodiment

According to the second exemplary embodiment described above, the gateway 100 sends a concatenated message to the core network 110 notifying the responses by the MTC devices, and also the gateway 100 sends the tempIDs and the grKeys in a concatenated message to the MTC devices which responded to the group information.

Therefore, according to the third exemplary embodiment, traffic between MTC devices and the network can be decreased and a secure communication can be established between them in the system of the third exemplary embodiment.

Furthermore, according to the third exemplary embodiment, the gateway 100 sends a concatenated message, which is made by concatenating replies from the MTC devices responded to the group information, to the core network 110.

By sending a concatenated message instead of forwarding replies from the MTC devices, it is possible to reduce the traffic in the system of the third exemplary embodiment. The decrease in the traffic would be more efficient especially when the size of the group of the MTC devices increases.

In addition, according to the third exemplary embodiment, authentication of the MTC devices is possible to be performed even the core network 110 does not have any previous knowledge about the MTC devices which are to be in the same group.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

For example, the operation in each exemplary embodiment mentioned above (operation shown in the flowchart and each sequence chart) can be carried out by hardware, software or a combined configuration of the software and the hardware.

In the case of carrying out a process by software, it may be possible that a program, which records sequence of the processes, is installed in a memory of a computer mounted on dedicated hardware and then, is executed. It may be also possible that the program is installed and executed in a general-purpose computer which can carry out various processes.

For example, it is possible that the program is recorded in advance in a hard disk and ROM (Read Only Memory) as a storage medium. It is also possible that the program is stored (recorded) temporarily or permanently in a removable storage medium such as CD-ROM (Compact Disc Read Only Memory), a MO (Magneto optical) disk, DVD (Digital Versatile Disc), a magnetic disk, a semiconductor memory or the like. It is possible to provide such removable storage medium as so-called packaged software.

Further, it may be possible that the program is installed by reading from the removable storage medium as mentioned above and it may be also possible that the program is transferred by radio from a download site to the computer as other method. It may be also possible that the program is transferred by a wire to the computer via a network such as LAN (Local Area Network) and the internet. It is possible that the computer receives the transferred program, and installs the program in a storage medium such as a built-in hard disk or the like.

Moreover, it is also possible that the system, which has been described in the exemplary embodiment mentioned above, has structure of a logical combination of plural apparatuses, and has a configuration in which functions of each apparatus are intermingled.

This application is based upon and claims the benefit of priority from Japanese patent application No. 2010-176115, filed on Aug. 5, 2010, the disclosure of which is incorporated herein in its entirety by reference.

The whole or part of the exemplary embodiments disclosed above can be described as, but not limited to, the following supplementary notes.

(Supplementary Note 1)

A communication apparatus which is connected to a network and a plurality of communication terminals comprising:

a group information sending means for sending group information which is received from the network;

an access control means for receiving a reply from the communication terminal which responded to the group information and for sending the reply to the network: and a temporary identifier and group key sending means for sending a temporary identifier and a group key to the communication terminal which responded to the group information, when the communication apparatus received the temporary identifier and the group key from the network.

(Supplementary Note 2)

The communication apparatus according to supplementary note 1, wherein the access control means concatenates the reply and sends the concatenated reply to the network, when the communication apparatus received the reply from the communication terminal.

(Supplementary Note 3)

The communication apparatus according to supplementary note 1 or 2, wherein the access control means determines that the group information sent to the communication terminal matches the group information held by the communication terminal, when the communication apparatus received the reply from the communication terminal, and performs access control to the responded communication terminal.

(Supplementary Note 4)

The communication apparatus according to supplementary note 3, wherein the access control means performs authentication between the communication terminal and the network, when the access control means determined that the group information to the communication terminal matches the group information held by the communication terminal.

(Supplementary Note 5)

The communication apparatus according to any one of supplementary notes 1 to 4, wherein the group information includes at least one of the following: an identifier of the group or information of feature of a communication terminal.

(Supplementary Note 6)

A communication system comprising:

a plurality of communication terminals;

a network; and a communication apparatus which relays communication between the plurality of communication terminals and the network:

wherein the communication apparatus receives group information from the network, sends the group information to the plurality of communication terminals, and sends a temporary identifier and a group key to the communication terminal replied to the group information.

(Supplementary Note 7)

The communication system according to supplementary note 6, wherein the communication apparatus comprises:

a group information sending means for sending group information which is received from the network;

an access control means for receiving a reply from the communication terminal which responded to the group information and for sending the reply to the network; and a temporary identifier and group key sending means for sending the temporary identifier and the group key to the communication terminal which responded to the group information, when the communication apparatus received the temporary identifier and the group key from the network.

(Supplementary Note 8)

The communication system according to supplementary note 6 or 7, wherein the access control means concatenates the reply and sends the concatenated reply to the network, when the communication apparatus received the reply from the communication terminal.

(Supplementary Note 9)

The communication system according to any one of supplementary notes 6 to 8, wherein the access control means determines that the group information sent to the communication terminal matches the group information held by the communication terminal, when the communication apparatus received the reply from the communication terminal, and performs access control to the responded communication terminal.

(Supplementary Note 10)

The communication system according to supplementary note 9, wherein the access control means performs authentication between the communication terminal and the network, when the access control means determined that the group information sent to the communication terminal matches the group information held by the communication terminal.

(Supplementary Note 11)

The communication system according to any one of supplementary notes 6 to 10, wherein the communication terminal includes:

a determining means for determining whether the group information received from the communication apparatus matches the group information held by the communication terminal; and a replying means for replying to the communication apparatus when the group information received from the communication apparatus matches the group information held by the communication terminal.

(Supplementary Note 12)

The communication system according to any one of supplementary notes 6 to 11, wherein the group information includes at least one of the following: an identifier of the group or information of feature of a communication terminal.

(Supplementary Note 13)

A communication method which is performed between a network and a plurality of communication terminals, the method comprising:

receiving group information from the network;

sending the group information to the plurality of communication terminals;

receiving a reply to the group information from the communication terminal: and sending a temporary identifier and a group key to the communication terminal replied to the group information.

(Supplementary Note 14)

The communication method according to supplementary note 13 further comprising:

sending group information which is received from the network:

receiving the reply from the communication terminal which responded to the group information;

sending the reply to the network: and sending the temporary identifier and the group key to the communication terminal which responded to the group information, when received the temporary identifier and the group key from the network.

(Supplementary Note 15)

The communication method according to supplementary note 13 or 14, further comprising:

concatenating the reply and sends the concatenated reply to the network, when the reply is received from the communication terminal.

(Supplementary Note 16)

The communication method according to any one of supplementary notes 13 to 15, further comprising:

determining that the group information sent to the communication terminal matches the group information held by the communication terminal, when received the reply from the communication terminal; and performing access control to the responded communication terminal.

(Supplementary Note 17)

The communication method according to supplementary note 16, further comprising:

performing authentication between the communication terminal and the network, when the access control means determined that the group information sent to the communication terminal matches the group information held by the communication terminal.

(Supplementary Note 18)

The communication method according to any one of supplementary notes 13 to 17, wherein the group information includes at least one of the following: an identifier of the group or information of feature of a communication terminal.

(Supplementary Note 19)

A storage medium for storing a communication program comprising:

a group information sending process for sending group information which is received from the network;

an access control process for receiving a reply from the communication terminal which responded to the group information and for sending the reply to the network: and a temporary identifier and group key sending process for sending a temporary identifier and a group key to the communication terminal which responded to the group information, when received the temporary identifier and the group key from the network.

(Supplementary Note 20)

The storage medium for storing a communication program according to supplementary note 19, wherein the access control process concatenates the reply and sends the concatenated reply to the network, when received the reply from the communication terminal.

(Supplementary Note 21)

The storage medium for storing a communication program according to supplementary note 19 or 20, wherein the access control process determines that the group information sent to the communication terminal matches the group information held by the communication terminal, when received the reply from the communication terminal, and performs access control to the responded communication terminal.

(Supplementary Note 22)

The storage medium for storing a communication program according to supplementary note 21, wherein the access control process performs authentication between the communication terminal and the network, when the access control process determined that the group information sent to the communication terminal matches the group information held by the communication terminal.

(Supplementary Note 23)

The storage medium for storing a communication program according to any one of supplementary notes 19 to 22, wherein the group information includes at least one of the following: an identifier of the group or information of feature of a communication terminal.

REFERENCE SIGNS LIST

100 Gateway
101, 111, 1001 Group information sending unit
102, 112, 1002 Access control unit
103, 113 tempID sending unit
104, 114 Storage unit
105, 115, 123 Authentication unit
106, 107, 116, 124 I/F (Interface)
110 Core network
120, 130, 140 MTC device
121 Matching unit
122 Replying unit
1000 Communication apparatus
1003 Temporary identifier and group key sending unit
1100 Network
1101 Communication terminal

The invention claimed is:

1. A communication apparatus which is connected to a network and a plurality of communication terminals in a group, the apparatus comprising:
 a group information sending unit which sends, to the group, group information which is received from the network;
 an access control unit which receives a reply from one of the communication terminals which responded to the group information and sends the reply to the network; and
 a temporary identifier and group key sending unit which sends a temporary identifier and a group key to the one of the communication terminals which responded to the group information, when the communication apparatus has received the temporary identifier and the group key from the network,
 wherein replies are received from plural ones of the communication terminals and wherein the access control unit concatenates the received replies and sends the concatenated replies to the network.

2. The communication apparatus according to claim 1, wherein the access control unit determines that the group information sent to the one of the communication terminals matches the group information held by the communication apparatus when the communication apparatus received the reply from the one of the communication terminals, and performs access control to the responded one of the communication terminals.

3. The communication apparatus according to claim 2, wherein the access control unit performs authentication between the one of the communication terminals and the network, when the access control unit has determined that the group information sent to the one of the communication terminals matches the group information held by the communication apparatus.

4. The communication apparatus according to claim 1, wherein the group information includes at least one of the following: an identifier of the group or information of a feature of the one of the communication terminals.

5. A communication system comprising:
 a plurality of communication terminals in a group;
 a network; and
 a communication apparatus which relays communication between the plurality of communication terminals and the network,
 wherein the communication apparatus receives group information from the network, sends the group information to the plurality of communication terminals, receives replies from the communication terminals, sends the replies to the network, and sends a temporary identifier and a group key to the communication terminals that replied to the group information when the temporary identifier and the group key have been received from the network, wherein the communication apparatus comprises:

a group information sending unit which sends the group information which is received from the network;

an access control unit which receives the replies from the communication terminals which responded to the group information and sends the replies to the network; and a temporary identifier and group key sending unit which sends the temporary identifier and the group key to the communication terminals which responded to the group information, when the communication apparatus has received the temporary identifier and the group key from the network, wherein replies are received from plural ones of the communication terminals and wherein the access control unit concatenates the received replies and sends the concatenated replies to the network.

6. The communication system according to claim 5, wherein the access control unit determines that the group information sent to one of the communication terminals matches the group information held by the communication apparatus when the communication apparatus has received the reply from the one of the communication terminals, and performs access control to the responded one of the communication terminals.

7. The communication system according to claim 6, wherein the access control unit performs authentication between the one of the communication terminals and the network, when the access control unit has determined that the group information sent to the one of the communication terminals matches the group information held by the communication apparatus.

8. The communication system according to claim 5, wherein each of the communication terminals includes:

a determining unit which determines whether the group information received from the communication apparatus matches the group information held by the respective one of the communication terminals; and a replying unit which replies to the communication apparatus when the group information received from the communication apparatus matches the group information held by the respective one of the communication terminals.

9. The communication system according to claim 5, wherein the group information includes at least one of the following: an identifier of the group or information of a feature of one of the communication terminals.

10. A communication method which is performed between a network and a plurality of communication terminals in a group, the method comprising:

a communication apparatus receiving group information from the network;

the communication apparatus sending the group information to the plurality of communication terminals;

the communication apparatus receiving a reply to the group information from one of the communication terminals;

sending the reply to the network; and the communication apparatus sending a temporary identifier and a group key to the one of the communication terminals that replied to the group information, when the temporary identifier and the group key have been received from the network, receiving replies from plural ones of the communication terminals, concatenating the received replies, and sending the concatenated replies to the network.

11. The communication method according to claim 10, further comprising the communication apparatus determining that the group information sent to the one of the communication terminals matches the group information held by the communication apparatus, when the reply has been received from the communication terminal, and performing access control to the responded one of the communication terminals.

12. The communication method according to claim 11, further comprising the communication apparatus performing authentication between the one of the communication terminals and the network, when it is determined that the group information sent to the one of the communication terminals matches the group information held by the communication apparatus at the time of the access control.

13. The communication method according to claim 10, wherein the group information includes at least one of the following: an identifier of the group or information of a feature of the one of the communication terminals.

* * * * *